United States Patent [19]
Giuffrida et al.

[11] Patent Number: 4,925,541
[45] Date of Patent: * May 15, 1990

[54] ELECTRODEIONIZATION APPARATUS AND METHOD

[75] Inventors: Anthony J. Giuffrida, N. Andover; Anil D. Jha; Gary C. Ganzi, both of Lexington, all of Mass.

[73] Assignee: Millipore Corporation, Bedford, Mass.

[*] Notice: The portion of the term of this patent subsequent to Dec. 30, 2003 has been disclaimed.

[21] Appl. No.: 908,913

[22] Filed: Sep. 18, 1986

Related U.S. Application Data

[60] Division of Ser. No. 762,804, Aug. 2, 1985, Pat. No. 4,632,745, which is a continuation of Ser. No. 628,930, Jul. 9, 1984, abandoned.

[51] Int. Cl.$^5$ .......................................... B01D 13/02
[52] U.S. Cl. ............................. 204/182.5; 204/182.4; 204/301
[58] Field of Search .................. 204/301, 182.3, 182.4, 204/182.5, 182.6

[56] References Cited

U.S. PATENT DOCUMENTS

| | | | |
|---|---|---|---|
| 2,799,644 | 5/1957 | Kollsman | 204/182.5 X |
| 2,923,679 | 2/1960 | Kressman | 204/182.4 |
| 3,014,855 | 12/1961 | Kressman | 204/182.4 |
| 3,149,061 | 9/1964 | Parsi | 204/182.4 |
| 3,291,713 | 12/1966 | Parsi | 204/182.5 X |
| 4,439,967 | 3/1984 | Sanchez et al. | 204/301 |

*Primary Examiner*—John F. Niebling
*Assistant Examiner*—John S. Starsiek, Jr.
*Attorney, Agent, or Firm*—Andrew T. Karnakis; Paul J. Cook

[57] ABSTRACT

An electrodeionization apparatus and process are provided for removing ions from liquids. Liquid to be purified is passed through depleting compartments containing mixed anion and cation exchange resin beads while a second liquid is passed through concentrating compartments free of ion exchange resin beads. Ions, under influence of a D.C. potential, pass from the depleting compartments into the concentrating compartments through ion permeable membranes. The beads in the depleting compartments are housed within subcompartments of controlled width and thickness and are retained therein by the ion permeable membranes which are secured to the wall of the subcompartments.

9 Claims, 11 Drawing Sheets

ELECTRODEIONIZATION APPARATUS AND METHOD

This application is a divisional application of copending application Ser. No. 06/762,804, filed August 2, 1985, now U.S. Pat. No. 4,632,745, which is a continuation of application Ser. No. 06/628,903, filed July 9, 1984, now abandoned.

BACKGROUND OF THE INVENTION

This invention relates to a novel electrodeionization apparatus and method adapted to transfer ions in a liquid under the influence of a polar field. More specifically, this invention relates to an electrodeionization apparatus and method adapted to purify aqueous liquids to effect the production of high purity water.

The purification of a liquid by reducing the concentration of ions or molecules in the liquid has been an area of substantial technological interest. Many techniques have been used to purify and isolate liquids or to obtain concentrated pools of specific ions or molecules from a liquid mixture. The most well known processes include electrodialysis, liquid chromatography, membrane filtration and ion exchange. A lesser known methodology is electrodeionization, occasionally mistermed filled cell electrodialysis. Although electrodeionization has the potential to be quite effective in removing ions from liquid, it has never been developed to the degree that it is competitive either structurally or operationally with the better known separation techniques. This is due primarily to the inconsistencies of structural design and unpredictable variances incurred by the presently known modes of use. This lack of structural design precision and nonpredictability of results have reduced the use of electrodeionization to the point where it is relatively unknown even to practitioners skilled in separation methodologies.

The first apparatus and method for treating liquids by electrodeionization was described by Kollsman in U.S. Pat. Nos. 2,689,826 and 2,815,320. The first of these patents describes an apparatus and process for the removal of ions within a liquid mixture in a depleting chamber through a series of anionic and cationic diaphragms into a second volume of liquid in a concentration chamber under the influence of an electrical potential which causes the preselected ions to travel in a predetermined direction. The volume of the liquid being treated is depleted of ions while the volume of the second liquid becomes enriched with the transferred ions and carries them in concentrated form. The second of these patents describes the use of macroporous beads formed of ion exchange resins as a filler material positioned between the anionic or cationic diaphragms. This ion exchange resin acts as a path for ion transfer and also serves as an increased conductivity bridge between the membranes for the movement of ions. These patents represent the primary structural framework and theory of electrodeionization as a technique. The term electrodeionization refers to the process wherein an ion exchange material is positioned between the anionic and cationic diaphragms. The term electrodialysis relates to such a process which does not utilize ion exchange resisns between the anionic and cationic diaphragms. Despite the fact that the Kollsman technique has been available for over 25 years, this technology has not been developed even to the point of practical use. This is due in no small part to the lack of structural designs and the unavailability of operational mode parameters which afford reliable operation of the electrodeionization apparatus. Illustrative prior art attempts to use the combination of electrodialysis and ion exchange materials to resisns to purify saline from brackish water are described in U.S. Pat. Nos. 2,794,777; 2,796,395; 2,947,688; 3,384,568 and 4,165,273. Attempts to improve electrodeionization apparatus are shown in U.S. Pat. Nos. 3,149,061; 3,291,713; 3,515,664; 3,562,139; 3,993,517 and 4,284,492.

Despite the contributions of the prior art, no reliable electrodeionization apparatus has been produced. The typical resin fouling and membrane scaling problems of electrodeionization remain unalleviated. Presently described electrodeionization apparatus remain unsuitable for desalination or for the production of high purity water. Hard waters, silica-containing waters and highly saline brackish waters, and waters containing colloidal particles and foulants still represent liquids that cannot be consistently and reliably purified by presently known electrodeionization apparatus and modes of operation. Extensive maintenance and cleaning of these apparatus remain necessary, the quality and volume of the purified liquids remain erratic and the ability to produce at least 1 meg-ohm centimeter quality water consistently and in sufficient volume remain unachieved.

Accordingly, it would be desirable to provide a method and apparatus utilizing electrodeionization capable of producing a high purity deionized water over long periods of time without the need for shutting down the apparatus either because of reduction of ion exchange resin performance or because of particle or scale build-up. Furthermore, it would be desirable to provide such a method and apparatus which can be operated efficiently with low energy requirements and high liquid throughput.

SUMMARY OF THE INVENTION

The present invention provides a method and apparatus capable of continuously producing water of up to about 10 meg-ohm cm quality or higher over long periods of time while avoiding serious reduction of ion exchange resin performance and avoiding the build-up of particulates and scale within the electrodeionization apparatus. The apparatus includes a plurality of electrodeionization compartments whose thickness, width and configuration are controlled and which contain ion exchange materials such as beads, fibers or the like. The electrodeionization ion depleting compartments wherein liquid is depleted of ions are formed from a spacer having a hollow central portion divided by ribs or the like to define subcompartments. The ion exchange resin beads within the subcompartments are retained in the subcompartments by bonding or physically restraining a cationic permeable membrane to one surface of the depleting compartments and to the ribs and bonding or physically restraining an anionic permeable membrane to the opposing surface of the depleting compartment to the ribs, thereby to define the subcompartments. The concentration compartments into which ions migrate from the depleting compartments are free of ion exchange beads. The electrodeionization apparatus can comprise a single stage or a plurality of stages in series wherein the process voltage can be controlled independently in each stage, if desired.

BRIEF DESCRIPTION OF THE DRAWINGS

FIGS. 10(a-e) are schematic diagrams showing possible liquid flow paths of electrode stream flows between electrical stages of this invention.

FIGS. 11(a-e) are schematic diagrams showing possible liquid flow paths for depletion and concentration compartments for each electrical stage.

DETAILED DESCRIPTION OF SPECIFIC EMBODIMENTS

In accordance with this invention, an electrodeionization apparatus is provided wherein each electrodeionization electrical stage includes an anode and a cathode and their compartments, a series of concentration compatments which include means for causing turbulent flow of liquid passing therethrough and a series of depletion compartments that comtain an ion exchange material such as a mixture of anion exchange resin and cation exchange resin. The depletion compartments are formed so that the ion exchange resin mixture is housed within independent discrete subcompartments each of which has a width of about four inches or less, preferably between about 0.5 and about 1.5 inches. The discrete subcompartments are formed by securing, such as by bonding, both the anion permeable membrane and the cation permeable membrane to the periphery of the depletion compartment and to ribs which extend across the thickness of and along the entire length of the depletion compartment so that each subcompartment is defined by a pair of ribs, the anion permeable exchange membrane and the cation permeable membrane. It has been found, in accordance with this invention that the thickness and width of the depletion compartments are critical to achieving efficient operation of the electrodeionization apparatus. The solid ion exchange material positioned within the subcompartments are constrained from moving between subcompartments by the ribs and ion permeable membranes. Representative suitable solid ion exchange materials include fibers or beads or the like. When employing ion exchange beads, typical bead diameter is about 0.04 inches or less, preferably between about 0.033 and about 0.012 inches in diameter (20 to 50 mesh).

The electrodeionization apparatus can comprise one or a plurality of stages. In each stage, an anode is positioned at an opposite end of a stack of depleting and concentrating compartments from an end at which a cathode is positioned. Each anode and cathode is provided with an adjacent electrode spacer and an ion permeable membrane wherein an electrolyte passes through the electrode spacer. The remaining portion of each stage comprises a series of alternating depletion and concentrating compartments constructed as set forth herein. The liquid to be depleted of ions can be passed in parallel through each depleting compartment in each stage and a second liquid can be passed through each concentrating compartment in parallel in each stage in order to effect removal of ions from the first liquid in the depleting compartments into the second liquid in the concentrating compartments. When a plurality of stages are utilized, the liquid removed from the depleting compartments in an upstream stage can be directed in series into the depleting compartments in the next adjacent downstream stage. Similarly, the liquid removed from the concentrating compartments of an upstream stage can be directed in series to the concentrating compartments in the next adjacent downstream stage. Electrolyte can be passed through the spacer adjacent each electrode in the electrodeionization apparatus and is removed from the electrodeionization apparatus. Other possible liquid flow arrangements will be discussed in detail with reference to FIGS. 10 and 11.

As stated above it is essential that the subcompartments in the depleting compartments have a controlled thickness and width in order to sustain high efficiency for ion depletion over long periods. The thickness of the subcompartment should be between about 0.25 and about 0.05 inches, preferably between about 0.06 and 0.125 inches. TLhe width of the subcompartment should be between about 0.3 and about 4 inches, preferably between about 0.5 and about 1.5 inches. There is no limit on the length of the compartment other than as dictated by practical construction and fluid pressure loss considerations. Obiously, the longer the subcompartment length, the greater the ion removal from the liquid therein. Generally, the length of the subcompartments are between about 5 inches and about 70 inches. The subcompartments can contain 100% anion exchange material, 100% cation exchange material or a mixture of the two. When it is desired to remove only a particular anion or particular cation, 100% of the appropriate ion exchange material is used. Usually it is desired to remove both cations and anions in order to produce a purified liquid product. When utilizing strong acid-base resin materials such as beads, the ratio of anion exchange resin beads to cation exchange resin beads generally are about 60 to 40 by volume. By utilizing the subcompartment structure in the depleting compartments, efficient mixing of the liquid and the beads therein is attained while avoiding channeling of the liquid through the depleting compartments as well as avoiding compaction or movement of the beads within a portion of the volume of the depleting compartment. Thus, efficient interchange of the ions and the liquid in the depleting compartment with the ions in the beads to effect ion removal from the liquid in the depleting compartment is attained. Furthermore, it has been found that by controlling the geometry of the subcompartments as set forth herein, relatively low energy requirements for the electrodeionization apparatus can be utilized even over long periods to attain desired liquid purity.

This invention will now be described with reference to the accompanying drawings. A multistage electrodeionization apparatus is shown in FIG. 1.

Figure 1:
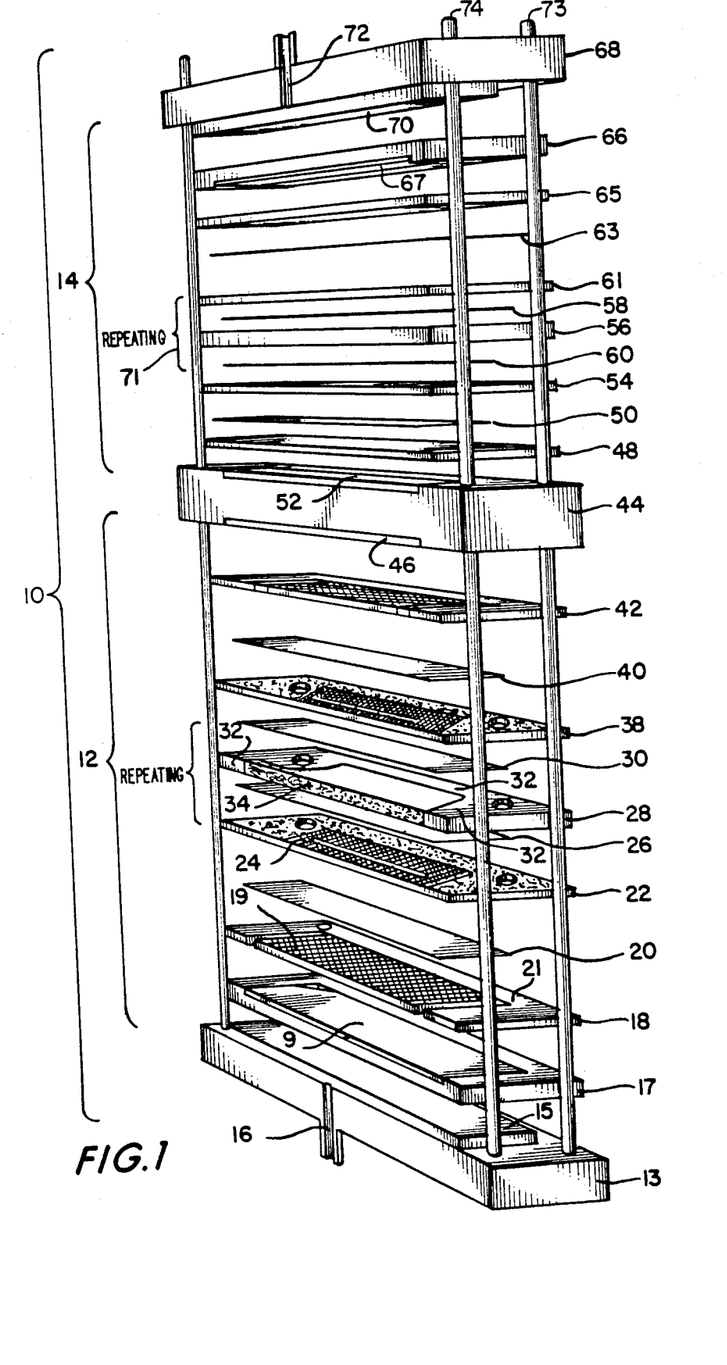
FIG. 1 is an exploded view of a multistage electrodeionization apparatus of this invention.

Referring to FIG. 1, the electrodeionization apparatus 10 comprises a first stage 12 and a second stage 14. The first stage 12 includes an end plate 13 having an expandable bladder 15 and an inlet 16 for fluid to expand the bladder 15. Adjacent the endplate 13 is an endblock 17 to house electrode 9 and provide desired manifolding. An electrode spacer 18 is positioned adjacent to the end block 17 and includes a screen 19 which effects turbulent flow of liquid passing through the electrode spacer 18. An ion permeable membrane 20 is sealed to the periphery 21 of electrode spacer 18. A spaer 22 formed of flixible material includes a screen 24. the spacer 22 and screen 24 comprise the concentrating compartment of the electrodeionization apparatus of this invention. The depleting compartment structure of this invention comprises an ion permeable membrane 26, a spacer formed of rigid material 28 and an ion permeable membrane 30. The ion permeable membranes 26 and 30 are sealed to the periphery 32 of the spacer 28 on opposite surfaces of the spacer 28. Mixed ion exchange resin beads 34 are housed within a central space which includes ribs (not shown) and are retained therein by the membranes 26 and 30. The unit which comprises spacers 22 and 28 and membranes 21 and 30 are repeated usually between about 5 and about 100 times in order to provide reasonable liquid flow through capacity in stage 12. A spacer 38 formed of flexible material and ion exchange membrane 40 and ion exchange membrane 30 sealed to the periphery of spacer 38 forms the end concentrating compartment. An electrode spacer 42 is positioned adjacent the middle block 44 and end electrode 46.

Stage 14 is identical in structure to stage 12 but can have more or fewer cell pairs and includes electrode spacer 48 and membrane 50 attached to the periphery of electrode spacer 48. An electrode 52 is provided in middle block 44. The repeating unit in stage 14 comprises a spacer 54 formed of flexible material as well as a spacer 56 formed of rigid material to which are secured such as by bonding or by mechanical means membranes 58 and 60. A spacer 61 formed of flexible material then is provided followed by a membrane 63, an electrode spacer 65, and endblock 66 and electrode 67, an end plate 68 and a flexible bladder 70 which is inflated by means of fluid passing through conduit 72. Flowthrough of liquid in the concentrating and depleting compartments as well as in the electrode compartment will be explained with reference to the remaining figures. The electrodeionization apparatus is retained in place by bolts 73 and 74 as well as by bolts on the opposing end of the apparatus 10 that extend along the entire length of the apparatus 10. The number of repeating units in the second stage 14 is usually about 5 and about 100, preferably between about 20 and about 60.

By independently varying voltage, electrical current can be controlled in each stage to provide good economy and efficiency for the overall electrodeionization process. Alternatively, a single stage 14 can be utilized as the apparatus of this invention or additional stages can also be utilized. In any event, the flow rate of liquid through the depleting and concentrating compartments and the operating voltage utilized in a particular stage is controlled to maximize efficiency for the overall apparatus in terms of ion removal and electrical power utilized.

Figure 2:
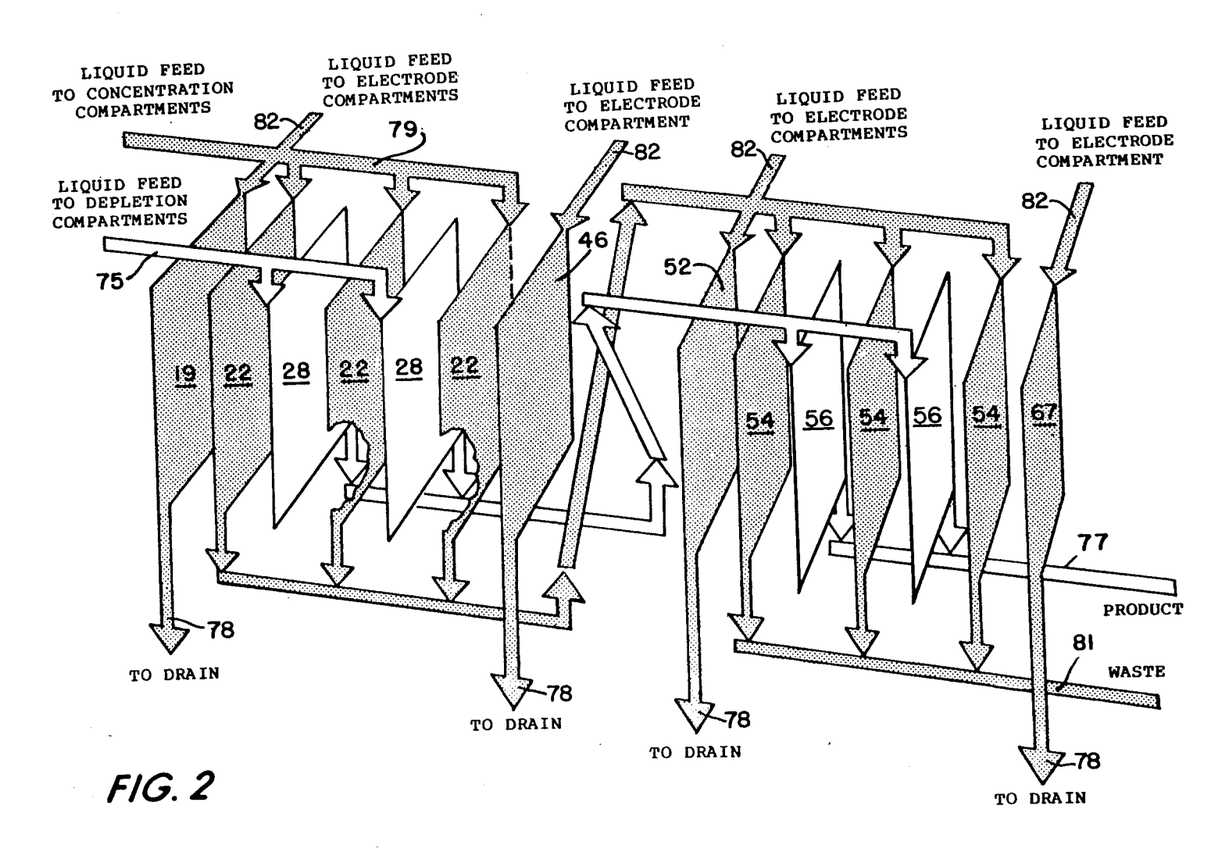
FIG. 2 is schematic view illustrating the operation of the apparatus of this invention.

Referring to FIG. 2, the flowpaths of the liquids in the various compartment are explained. Liquid to be purified enters inlet 75, passes through depletion compartments 28, is then passed through depletion compartments 56 and is recovered from outlet 77. Concentrating liquid is passed through outlet 79 through concentrating compartmens 22 and 54 and thence through outlet 81 to drain. Liquid electrolyte is circulated through electrode compartments 19, 46, 52 and 67 from inlets 82 and is discarded to drain through outlet 78.

Figure 3:
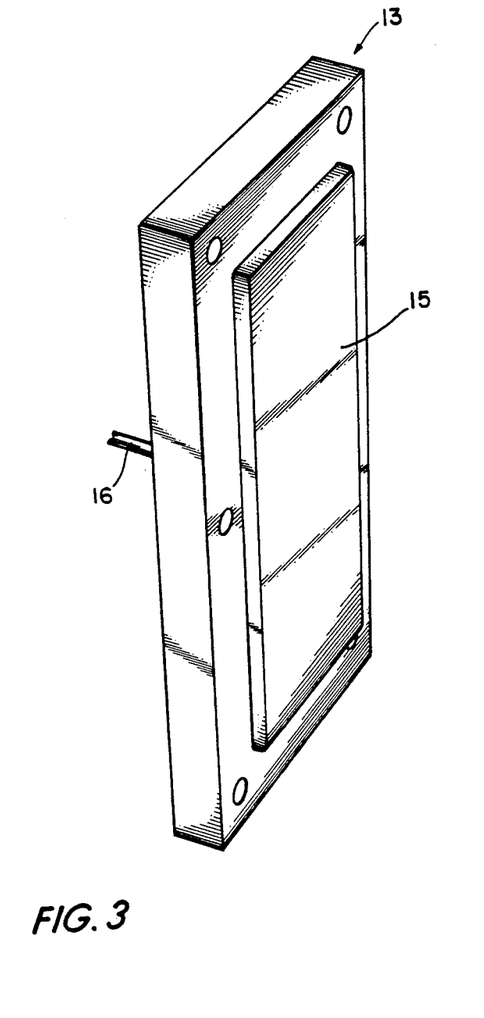
FIG. 3 is a pictorial view of a closing mechanism useful in the apparatus of this invention.

Referring to FIG. 3, the end plate 13 includes a bladder 15 and conduit 16 through which fluid can enter in order to expand bladder 15. Bolt holes are provided around the periphery of the end plate in order to pass bolts thereto and to secure the entire apparatus during use.

Figure 4:
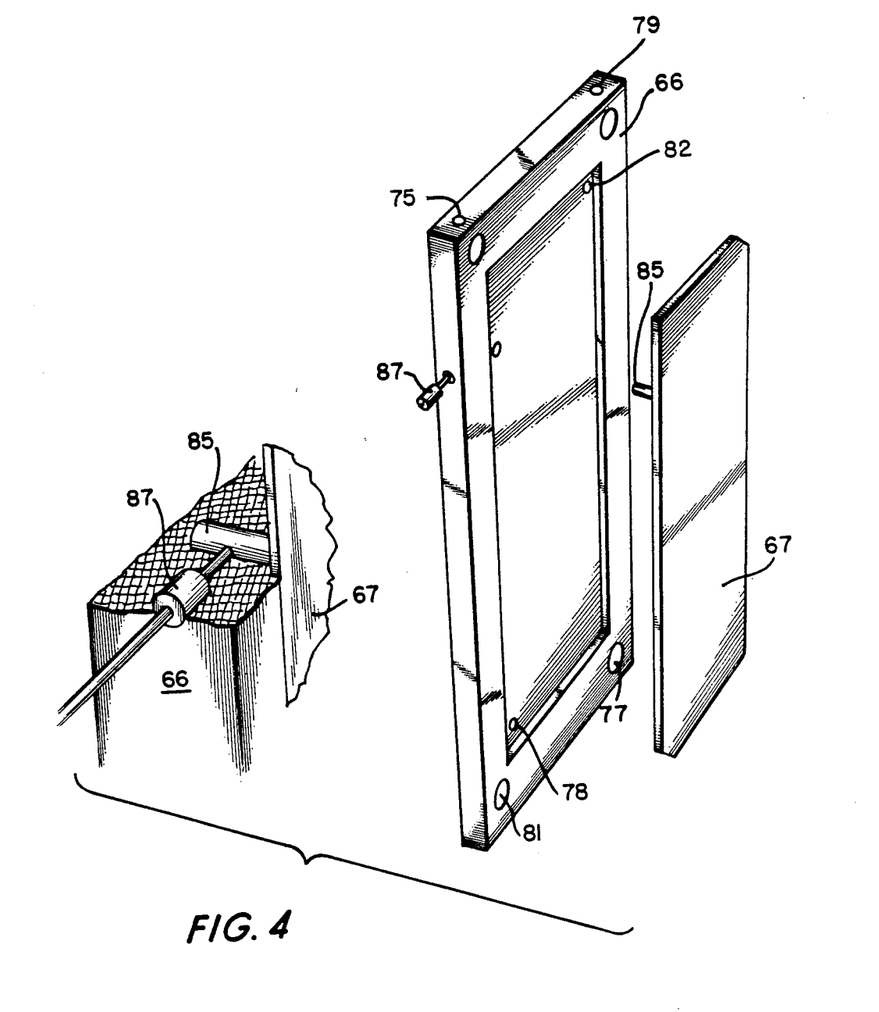
FIG. 4 is a pictorial view of an electrode structure useful in the apparatus of this invention.

Referring to FIG. 4, the electrode structure is shown which comprises a rigid block 66 and an electrode 67. The end block 66 is provided with electrolyte feed inlet 82 and electrolyte waste outlet 78. Electrode 67 includes a connector 85 which contacts the exterior electrical connection 87 as shown in the detail portion of FIG. 4. The block 66 includes an inlet 75 and outlet 77 for depletion compartments and inlet 79 and outlet 81 for concentration compartments.

Figure 5:
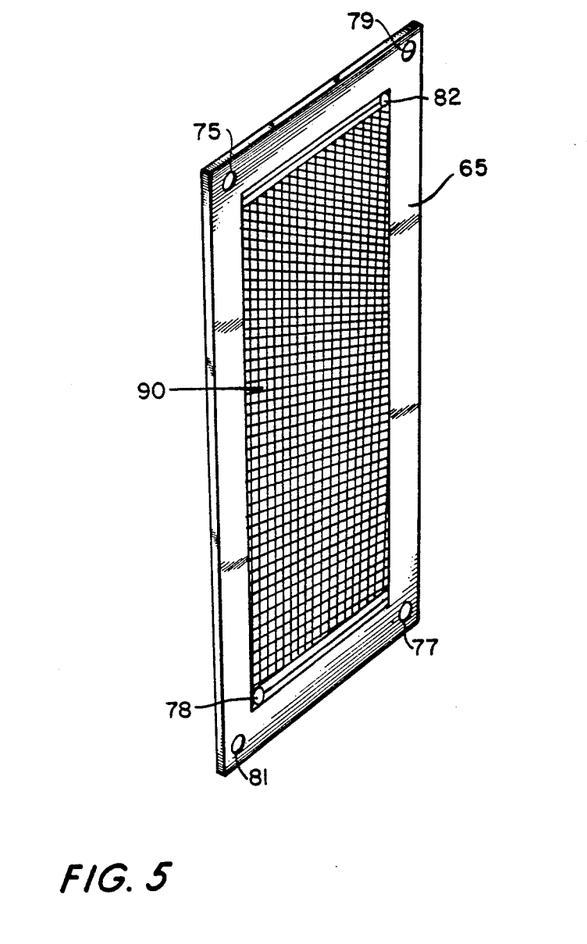
FIG. 5 is a pictorial view of a spacer construction positioned adjacent an electrode of the apparatus of this invention.

Referring to FIG. 5, the electrode spacer 65 includes electrolyte inlet 82 and electrolyte outlet 78 and a screen 90 for effecting turbulence of liquid passing therethrough.

Figure 6:
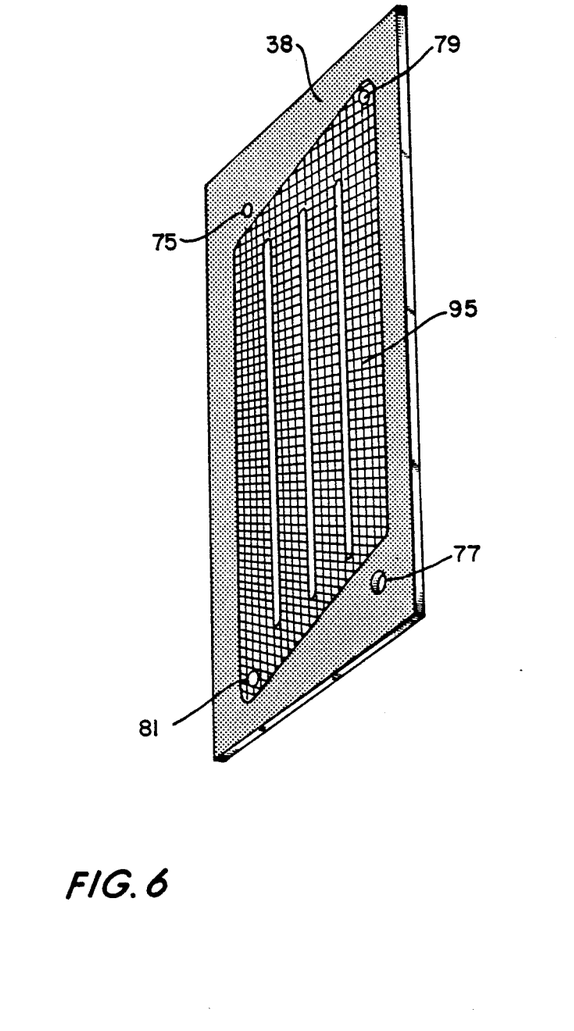
FIG. 6 is a pictorial view of a flexible spacer construction which includes the concentration chambers of the apparatus of this invention.

Referring to FIG. 6, the spacer formed of flexible material, e.g. spacer 38, includes a liquid inlet 79 and a liquid outlet 81 which provide liquid communication to the interior of spacer 38 in which is positioned a screen 95 in order to effect turbulent liquid flow. The outlet 77 permits passage of liquid into the adjacent depleting compartments and inlet 75 permits liquid removal from the adjacent depleting compartment without admixture of the purified liquid with the liquid in the concentrating compartment formed in spacer 38.

Figures 7, 8:
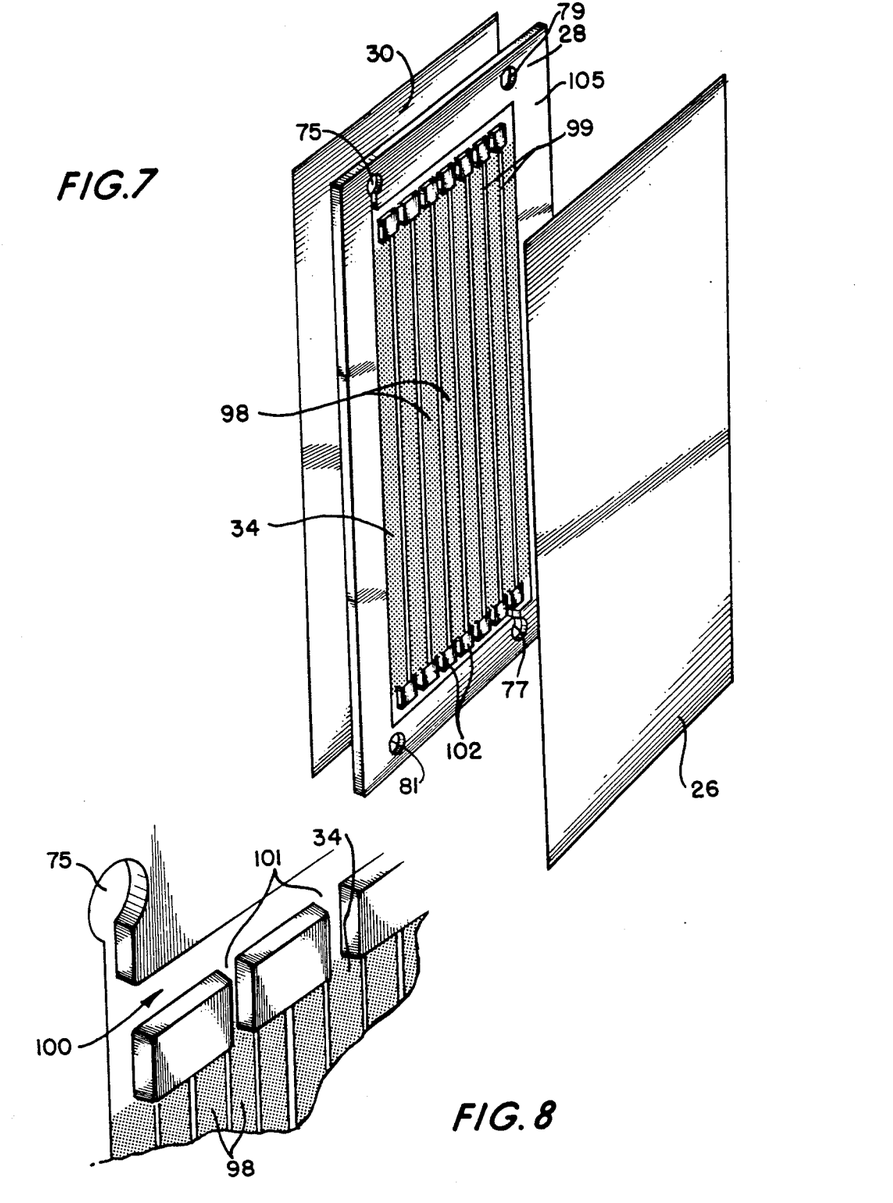
FIG. 7 is a pictorial view showing the depletion chambers of the apparatus of this invention.
FIG. 8 is a detailed view of the liquid inlet means to the structure of FIG. 7.

Referring to FIGS. 7 and 8, the structure of the depleting compartments of this invention is shown in detail. The depleting compartment comprises a rigid spacer, e.g. spacer 28, and an anion permeable membrane 30 and cation permable membrane 26. The ion exchange materials 34 are housed within subcompartments formed by the membranes 26 and 30, the wall 105 and the ribs 99. The membranes 26 and 30 are sealed along their entire length to wall 105 and ribs 99. The membranes 26 and 30 are also sealed to the periphery of the rigid spacer 28 so that the individual subcompartment 98 are effectively isolated from each other. Liquid to be purified enters inlet 75, passes along conduit 100, through inlets 101 and into the subcompartments 98 wherein they are subjected to an electrical voltage in order to pass anions through membrane 30 and cations through membrane 26. The purified liquid then passes through outlets 102 and spacer outlet 77 wherein it is collected in accordance with the explanation of FIG. 2.

Figure 9:
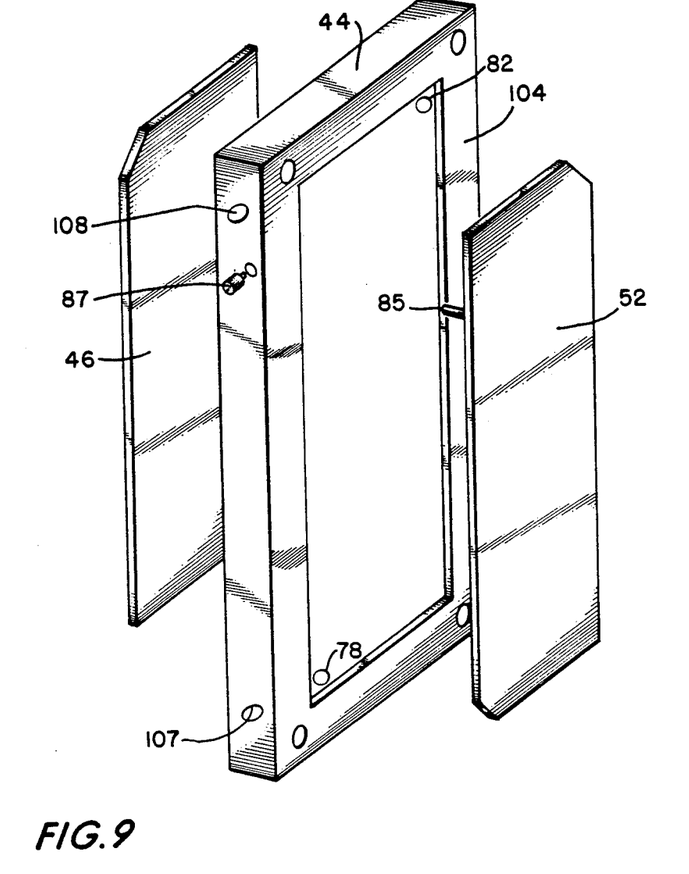
FIG. 9 is a pictorial view of an interior electrode assembly utilized in the plural stage embodiment of the apparatus of this invention.
Figure 10A:
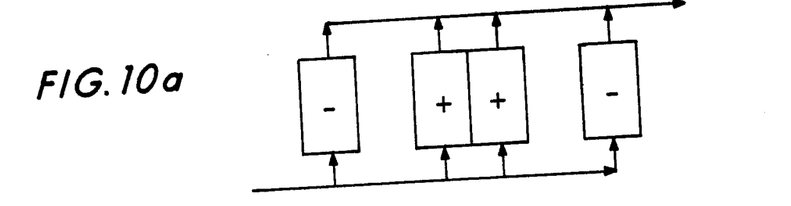
Figure 10B:
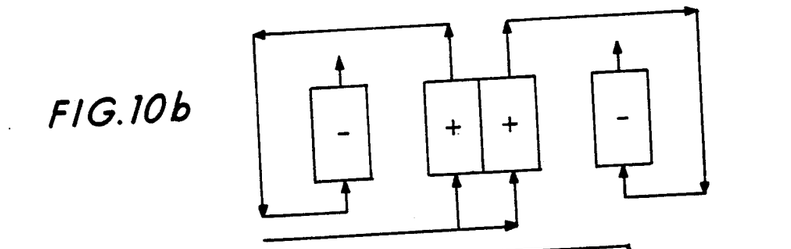
Figure 10C:
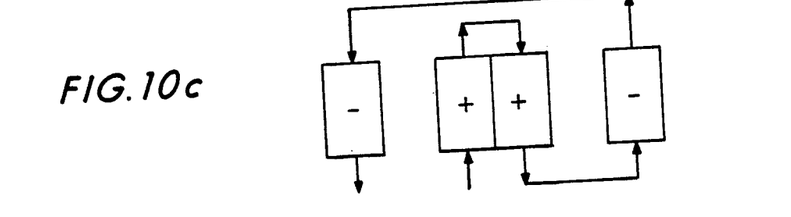
Figure 10D:
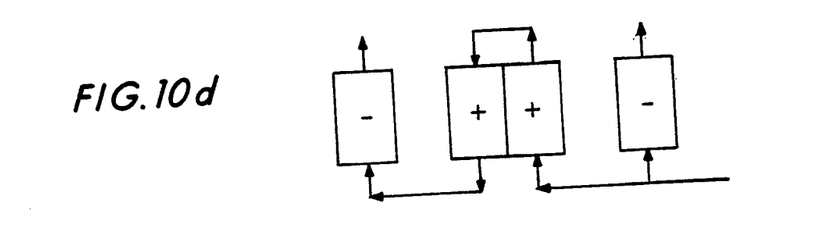
Figure 10E:
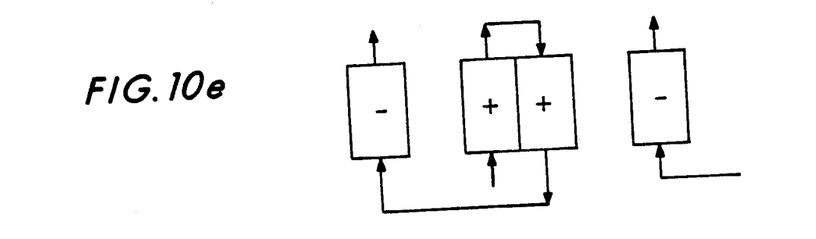
Figure 11A:
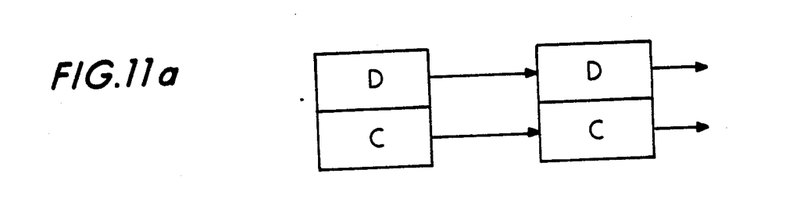
Figure 11B:
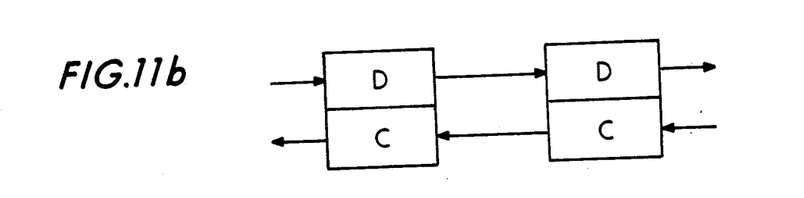
Figure 11C:
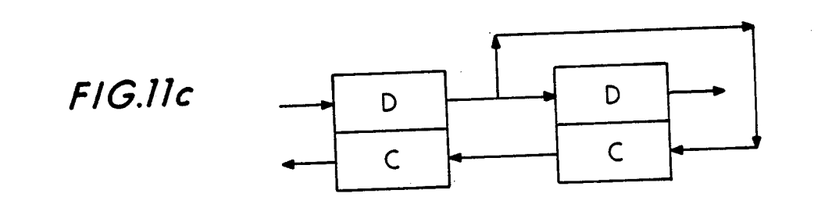
Figure 11D:
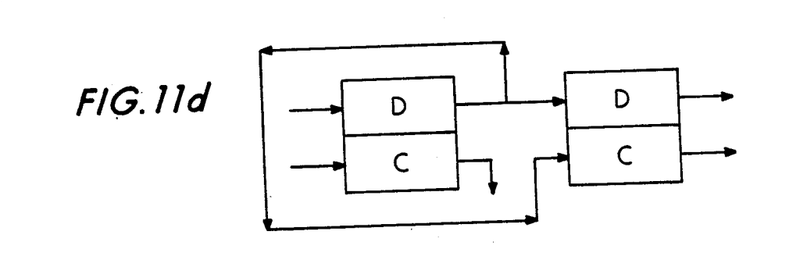
Figure 11E:
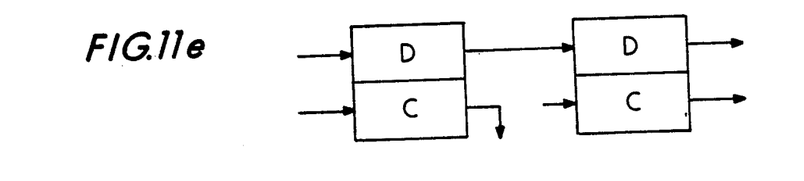

Referring to FIG. 9, the middle electrode block 44 includes electrodes 52 and 46 each having electrical connectors 85 and 87 as shown in FIG. 4. The connection for electrode 46 is not shown in FIG. 9 but is positioned ont he wall 104 in the same manner as shown for electrode 52. Inlet 108 is provided for electrolyte for electrode 46 and outlet 107 is provided for waste electrolyte utilized with electrode 52. The same arrangement is provided on wall 104 for the electrolyte inlet and outlet (not shown).

FIG. 10, is a schematic illustration of various flows of the electrode streams of an electrodeionization apparatus assuming two electrical stages. In embodiment (a), inlet liquid is passed into each electrode compartment and remvoed therefrom in parallel. In embodiment (b), inlet liquid is passed into each anode compartment; removed therefrom, passed to the cathode compartment in the same electrical stage and removed from the apparatus. In embodiment (c), inlet liquid is passed into an anode compartment of the first stage, directed to an anode compartment in a second electrical stage, passed to the cathode compartment of the second electrical stage, passed to the cathode compartment of the first electrical stage and then remvoed from the apparatus. In embodimetn (d) liquid is passed in parallel to the anode compartment and cathode ccompartment of a second electrical stage. Liquid from the cathode compartment is removed from the apparatus while liquid removed from the anode compartment is passed sequentially to the anode compartment and cathode compartment of an adjacent electrical stage. In embodiment (e) liquid is passed sequentially to the anode compartment of a first stage, the anode compartment of a second stage, the cathode compartment of the first stage and remvoed from the aperture. A second liquid stream product from a first stage depleting compartment is passed through the cathode compartment of the second stage. FIG. 11 is a schematic illustration of various flow configurations of depleting and concentrating compartments assuming two electrical stages. In embodiment (a) of FIG. 11 two liquid streams are cocurrently passed in parallel; one to all the depletion compartments sequentially and the other through the concentration compartments sequentially. In embodiment (b) the liquid stream are flowed as in embodiment (a) except that they are flowed countercurrently. In embodiment (c) a portion of the depletion stream from the first stage is cycled into the concentration stream and flowed countercurrent through the concentration compartments sequentially. In embodiment (d) a portion of the depletion stream from the first stage is passed directly to the concentration compartment of a second stage concentration compartment. The first stage concentrating compartment is fed from the original feed. In embodiment (e) the depleting compartments are fed concurrently while the first and second stage concentrating compartments are fed separately from the original feed.

In one aspect of this invention, the apparatus is operated periodically during the process under conditions to polarize water in the depleting compartments therein to form hydrogen and hydroxyl ions. Generaly, operating voltage above about 1.5 volts/cell pair will effect water polarization. The hydrogen ions are selectively removed from the depletion compartments through the cation permeable membranes thereby to decrease the pH of the water in the concentrating compartment to about 5 or less. By operating in this manner any scale formed in the concentration compartments is dissolved. The low pH effluent from the anode compartment then can be directed to the cathode-compartment in order to dissolve any scale formed therein. During this step product from the depletion compartments is descarded because of its elevated pH. The effluent from the electrode compartments formed during the scale removal step is descarded. Normal operating voltages then are resumed and the product from the depletion compartments is recovered.

In another aspect of this invention, the apparatus can be backwashed to remove small particles retained within the apparatus, particularly within the depletion compartments. Since the inlets to the subcompartments are smaller than the size of the ion exchange materials therein, only the smaller particles are removed therefrom during backwashing. Backwashing merely comprises passing cleansing liquid into the apparatus through the normally used liquid outlet(s) and removing the cleansing liquid through the normally used liquid inlet(s).

In a third aspect of this invention, the liquid to be purified can be pretreated prior to electrodeionization to remove specific containments such as organics. A softener-scavenger system can be employed wherein the softener can include a cation exchange resin and/or an anion exchange resin to remove specific ions. The scavenger can comprise an anion exchange resin in order to remove foulants that foul the anion resin such as organics including tannins and malignans, humic acid, fulvic acids and lignins. The ion exchange resins can be regenerated with brine (NaCl) efficiently and simply.

Any anion permeable membrane or cation permeable membrane having the strength to withstand the operating pressure differential, typically up to about 5 psi, can be utilized in the present invention. It should be pointed out that sealing of the membranes to the ribs forming the subcompartments permits the use of higher operating pressures and enhances the apparatus of the prior art since the assembly strength is thereby increased. Representative suitable anion permeable membranes include a homogeneous type web supported styrene—divinylbenzene based with sulfonic acid or quarternary ammonium functional groups sold under the identifications CR61-CZL-386 and AR 103-QZL-386 by Ionics Inc.; a heterogeneous type web supprted using styrene—divinylbenzene based resins in a polyvinylidene fluoride binder sold under the identifications MC-3470 and MA-3475 by Sybron/Ionac; homogeneous type unsupported—sulfonated styrene and quaternized vinylbenzylamine grafts of polyethylene sheet sold under the name, Raipore by RAI Research Corporation; a homogeneous type web supported styrene—divinylbenzene based with sulfonic acid or quaternary ammonium functional groups sold under the name Neosepta by Tokuyama Soda Co. Ltd.; a homogeneous type web supported styrene—divinylbenzene based with sulfonic acid or quaternary ammonium functional groups sold under the name Aciplex by Asahi Chemical Industry Co. Ltd.

The process of this invention can be controlled by measuring product water conductivity from all or any one of the stages and adjusting the process parameters including process voltage, liquid flow velocities, temperatures, pressures, and electrical current accordingly.

The following is a description of two methods for controlling the demineralization of an electrodeionization system. The methods can be used separately or in combination in a single or multi-electrical staged system. The first method senses the resistivity and temperature of the feed water and the appropriate cell pair voltage is applied to demineralize the liquid to the desired fraction salt removal.

The second method senses the product resistivity and temperature that is used to control the voltage of the stage to produce water of the desired quality. This type of voltage control can be used to provide product water of a pre-selected quality.

An example of a two-stage system is as follows: The first stage is operated at a variable voltage based on the feed water quality (about 0.5 to 2.0 volts per cell pair) appropriate to achieve approximately 70–80 percent salt removal by using a predetermined resistivity/temperature/percent salt removal relationship. The automatically applied voltage permits operation below the polarization point, thus assuring efficient operation without scaling. The second stage is operated at a variable voltage based on the product water quality (about 0.5 to 2.0 volts per cell pair), appropriate to provide water of a pre-selected quality. Since the feed water to the second stage is product water from the first, the second stage feed is less prone to scaling. For this reason polarization in the second stage is acceptable, and the voltage can therefore be varied to any degree to provide the required product quality.

We claim:

1. The process for removing ions from a liquid in an electrodeionization apparatus adapted to remove ions from a liquid which include:
   a cathode compartment at a first end of said apparatus,
   an anode compartment at an end of said apparatus opposite said first end,
   a plurality of alternating ion depletion compartments and ion concentration compartments positioned between said cathode compartment and said anode compartment,
   each of said ion depletion compartments comprising a spacer and a plurality of subcompartments formed by a plurality of ribs extending along the length of each of said ion depletion compartments, each of said subcompartments containing a mixture of anion exchange resin and cation exchange resin,
   each of said subcompartments having a width between about 0.3 and 4 inches and a thickness between about 0.05 and 0.25 inches and wherein the thickness of said subcompartments is defined by an anion permeable membrane and a cation permeable membrane being bonded to each of said ribs along the length of said ribs and to said spacer,
   each of said concentration compartments being free of ion exchange solid composition,
   means for passing a first liquid to be purified through said ion depletion compartments,
   means for passing a second liquid for accepting ions from said first liquid, through said concentration compartments,
   means for applying an electrical voltage between an anode in said anode compartment and a cathode in said cathode compartment and,
   means for recovering purified liquid from said depletion compartment,
   which comprises passing a first liquid to be purified through said depletion compartments, passing a second liquid adapted to accept ions through said concentration compartments, passing an electrolyte through each of said anode and cathode compartments and recovering purified liquid from said ion depletion compartments.

2. The process of claim 1 wherein the ion exchange material comprises a mixture of anion exchange resin beads and cation exchange resin beads and wherein the volume ratio of anion exchange resin beads to cation exchange resin beads is controlled to be between about 1.75 and 1.25.

3. The process of any one of claims 1 or 2 wherein the voltage between a cell pair defined by an anion permeable membrane, a depleting cell, a cation permeable membrane and a concentration cell is between about 0.5 and 2 volts.

4. The process of any one of claims 1 or 2 wherein the flow velocity of liquid through said ion depletion compartments is between about 10 cc/min/inch width and 300 cc/min/inch width.

5. The process for removing ions from a liquid is an electrodeionization apparatus adapted to remove ions from a liquid which comprises a plurality of stages, each stage comprising:
   a cathode compartment at a first end of said apparatus,
   an anode compartment at an end of said apparatus opposite said first end,
   a plurality of alternating ion depletion compartments and ion concentration compartments positioned between said cathode compartment and said anode compartment to define a first stage,
   each of said ion depletion compartments comprising a spacer and a plurality of subcompartments formed by a plurality of ribs extending along the length of each of said ion depletion compartments.
   each of said subcompartments containing a mixture of anion exchange resin and cation exchange resin, each of said subcompartments having a width between about 0.3 and 4 inches and a thickness between about .05 and 0.25 inches and wherein the thickness of said subcompartments is defined by an anion permeable membrane and a cation permeable membrane being bonded to each of said ribs along the length of said ribs and to said spacer
   each of said concentration compartments being free of ion exchange resin solid composition,
   means for passing a first liquid to be purified through said ion depletion compartments,
   means for passing a second liquid for accepting ions from said first liquid, through said concentration compartments
   means for applying an electrical voltage between an anode in said anode compartment and a cathode in said cathode compartment,
   means for transferring purified liquid from the depletion compartments of the first stage to a next adjacent downstream stage,
   means for transferring said second liquid from the concentration compartments of the first stage to an adjacent downstream stage,
   and means for recovering purified liquid from the ion depletion compartments in a final downstream stage,
   which comprises passing a first liquid to be purified sequentially through said depletion compartments in each of said stages, passing a second liquid adapted to accept ions through the concentration compartments in each of said stages, passing an electrolyte through each of said anode and cathode compartments in each of said stages and recovering purified liquid from said ion depletion compartments.

6. The process of any one of claims 1, 2, or 5 wherein the first liquid is treated in a preliminary step to remove ions and organics from said first liquid.

7. The process of any one of claims 1, 2, or 5 wherein the first liquid is treated in a preliminary step with an ion exchange resin to remove ions from said first liquid and with a scavenger resin to remove foulants from said first liquid.

8. The process of any one of claims 1, 2, or 5 wherein the electrodeionization apparatus is backwashed periodically by introducing cleansing liquid into the apparatus of claim 1 into a normally used liquid outlet of each depletion compartment and removing said cleansing liquid from a normally used liquid inlet of each depletion compartment.

9. The process of any one of claims 1, 2, or 5 wherein the voltage in the electrodeionization apparatus is controlled to polarize water in the depletion compartments thereby to effect hydrogen ion transfer into the concentration compartments.

* * * * *

REEXAMINATION CERTIFICATE (2349th)

United States Patent [19]

Giuffrida et al.

[11] B1 4,925,541

[45] Certificate Issued * Aug. 2, 1994

[54] ELECTRODEIONIZATION APPARATUS AND METHOD

[75] Inventors: Anthony J. Giuffrida, N. Andover; Anil D. Jha; Gary C. Ganzi, both of Lexington, all of Mass.

[73] Assignee: Millipore Corp., Bedford, Mass.

Reexamination Request:
No. 90/003,087, Jun. 7, 1993

Reexamination Certificate for:
Patent No.: 4,925,541
Issued: May 16, 1990
Appl. No.: 908,913
Filed: Sep. 18, 1986

[ * ] Notice: The portion of the term of this patent subsequent to Dec. 30, 2003, has been disclaimed.

Related U.S. Application Data

[60] Division of Ser. No. 762,804, Aug. 2, 1985, Pat. No. 4,632,745, which is a continuation of Ser. No. 628,930, Jul. 9, 1984, abandoned.

[51] Int. Cl.$^5$ .................. B01D 61/48; B01D 61/50; B01D 61/46; B01D 61/42
[52] U.S. Cl. .................... 204/182.5; 204/182.4; 204/301
[58] Field of Search ............ 204/301, 182.4, 182.5

[56] References Cited

U.S. PATENT DOCUMENTS

| | | | |
|---|---|---|---|
| 2,689,826 | 9/1954 | Kollsman | 204/301 |
| 2,708,658 | 5/1955 | Rosenberg | 204/301 |
| 2,794,777 | 6/1957 | Pearson | 204/151 |
| 2,796,395 | 6/1957 | Roberts | 204/151 |
| 2,799,644 | 7/1957 | Kollsman | 204/301 |
| 2,815,320 | 12/1957 | Kollsman | 204/180 |
| 2,923,674 | 2/1960 | Kressman | 204/182.4 |
| 2,947,688 | 8/1960 | Murphy | 210/23 |
| 3,014,855 | 12/1961 | Kressman | 204/182.4 |
| 3,149,061 | 9/1964 | Parsi | 204/180 |
| 3,291,713 | 12/1966 | Parsi | 204/180 |
| 3,359,194 | 12/1967 | Kollesman | 204/180 |
| 3,384,568 | 5/1968 | Kato | 204/301 |
| 3,515,664 | 6/1970 | Johnson | 204/301 |
| 3,562,139 | 2/1971 | Leitz | 204/296 |
| 3,869,376 | 5/1974 | Tejeda | 204/301 |
| 3,993,517 | 11/1976 | Schneider | 156/13 |
| 4,032,452 | 6/1977 | Davis | 210/243 |
| 4,165,273 | 8/1979 | Azarov | 204/301 |
| 4,284,492 | 8/1981 | Karn | 204/299 |
| 4,437,967 | 3/1984 | Sanchez | 204/301 |
| 4,465,573 | 8/1984 | O'Hare | 204/182.8 |

FOREIGN PATENT DOCUMENTS

815154  6/1959  United Kingdom .

OTHER PUBLICATIONS

K. S. Spiegler, ed. "Principles of Desalination", Academic Press, New York (1966) 234–235.
T. A. Davis "Electrophoresis" Industrial Membrane Technology, The Center for Professional Advancement, East Brunswick, N.J. (1976) pp. 1, 11–14.
N. A. Wynhausen "Ion Exchange Regeneration for the Soft Water Service Industry" Southwest Salt Company (1983) 5–9.
Matejka, "Continuous Production of High-Purity Water by Electro-deionisation", J. Appl. Chem. Biotechnol., 1971 vol. 21, Apr. pp. 117–120.
"Electro-Regeneration of Ion-Exchange Resins", (List continued on next page.)

*Primary Examiner*—John F. Niebling

[57] ABSTRACT

An electrodeionization apparatus and process are provided for removing ions from liquids. Liquid to be purified is passed through depleting compartments containing mixed anion and cation exchange resin beads while a second liquid is passed through concentrating compartments free of ion exchange resin beads. Ions, under influence of a D.C. potential, pass from the depleting compartments into the concentrating compartments through ion permeable membranes. The beads in the depleting compartments are housed within subcompartments of controlled width and thickness and are retained therein by the ion permeable membranes which are secured to the wall of the subcompartments.

OTHER PUBLICATIONS

Davis Southern Research Institute, NIH grant 70-2108, Report #AK 2-70 2108-F, Jun. 11, 1971, pp. 1-55.

"Electro-Regeneration of Ion-Exchange Resins", Davis, Southern Research Institute, NIH grant 70-2108, Report #AK—2-70-2108-F, Feb., 1972, pp. 1-69.

"Electro-Regenerated Ion-Exchange Deionization of Drinking Water", Davis, Contract 68-03-2209, EPA-600/1-77—035, Jun. 1977, pp. 1-71.

Korngold, "Electrodialysis Processes Using Ion Exchange Resins Between Membranes", Desalination, 16(1975) 225-233.

Shaposhnik, et al., "Demineralization of Water by Electrodialysis with Ion-Exchanger Packing Between the Membranes", Translated from Zhurnal Prikladnoi Khimii, vol. 46, #12, pp. 2659-2663, Dec. 1973.

Walters, et al., "Concentration of Radioactive Aqueous Wastes-Electromigration Through Ion-Exchange Membranes", Industrial and Engineering Chemistry, Jan. 1955, pp. 61-67.

Gittens, et al., "The Application of Electrodialysis to Demineralisation", AIChE-I. Chem. E. Symposium Series #9, 1965 pp. 79-83.

Outline for Lectures at the Center for Professional Advancement, Industrial Membrane Technology—Dialysis, Davis, pp. 1-88 (1976).

Gluekauf British Chemical Engineering, Dec. 1959, pp. 641-651.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-9 is confirmed.

* * * * *